United States Patent Office 3,829,429
Patented Aug. 13, 1974

3,829,429
CATALYTIC SYNTHESIS OF SUBSTITUTED PYRIDINES FROM ACETYLENES AND NITRILES
Robert A. Clement, Wilmington, Del., assignor to E. I. du Pont de Nemours and Company, Wilmington, Del.
No Drawing. Continuation-in-part of abandoned application Ser. No. 1,324, Jan. 7, 1970. This application Nov. 22, 1972, Ser. No. 308,838
Int. Cl. C07d *31/04*
U.S. Cl. 260—290 P      4 Claims

ABSTRACT OF THE DISCLOSURE

Novel process for the preparation of substituted pyridines comprising contacting an alkyl, alkylene or aryl substituted nitrile with at least one acetylenic compound of the formula $R^1—C\equiv C—R^2$, wherein $R^1$ and $R^2$ may be H, alkyl, alkoxy, alkenyl or aralkyl at about 150° C.–600° C. in the presence of a cobalt catalyst.

RELATED APPLICATION

This application is a continuation-in-part of application U.S. Ser. No. 1,324, filed Jan. 7, 1970, now abandoned.

BACKGROUND OF THE INVENTION

Field of Invention

This invention is related to the synthesis of substituted pyridines which are widely used in synthesis of polymers, pharmaceutical products, pesticides, and many other classes of valuable products.

DESCRIPTION OF THE PRIOR ART

In a process of reacting acetylenes with nitriles in the presence of an alkali metal catalyst yielding principally pyrimidines it was disclosed that in some cases pyridines were obtained as a minor by-product [J. C. Sauer and W. K. Wilkinson U.S. Pat. 2,524,479 and T. L. Cairns, J. C. Sauer, W. K. Wilkinson, J. Am. Chem. Soc., *74*, 3989 (1952)]. Thus, the reaction between benzonitrile and acetylene resulted in 2,4-diphenylpyrimidine in a 29% yield and 2-phenylpyridine in only a 1.8% yield. There is no reference to catalysts other than alkali metals and their alkyl and aryl derivatives or to a process of preparing pyridines at higher yields and without obtaining pyrimidines as the major co-product.

SUMMARY OF THE INVENTION

According to the present invention there is provided a process for the preparation of substituted pyridines comprising contacting at about 150° C. to 600° C. in the presence of a cobalt catalyst selected from the group consisting of cobalt metal, cobalt oxides, simple cobalt salts or cobalt complexes in which the cobalt has two or four to six coordinating sites occupied by ligands selected from the group of hydrogen [1], alkyl [1], carbonyl [4], nitroso [1], phosphine [4], dodecahydrodecaborate$^{-2}$ [2], enolates of β-keto esters [3], and 1,3-diketones [3], poly(pyrazolyl)borates [2], glyoximes [2], with the proviso that the number of ligands linked to each cobalt atom does not exceed the bracketed number following each ligand class a nitrile of the formula $R^5—C\equiv N$, wherein $R^5$ is alkyl, alkenyl or aryl of up to 20 carbon atoms and may be substituted with cyano, alkoxycarbonyl and carbonyl provided that the resultant nitrile is not subject to rapid homooligomerization or homopolymerization under the reaction conditions, with
at least one acetylenic compound of the formula $$R^1—C\equiv C—R^2,$$

wherein $R^1$ and $R^2$ may be hydrogen, alkyl of up to 10 carbons, alkenyl of up to 10 carbons, aralkyl of up to 10 carbon atoms or alkoxy of up to 12 carbon atoms, provided that
the acetylenic compound is not subject to rapid homooligomerization or homopolymerization under the reaction conditions.

DESCRIPTION OF THE PREFERRED EMBODIMENTS

The catalytic process of this invention for the synthesis of pyridines by the reaction of nitriles with at least one acetylenic compound in the presence of a cobalt catalyst can be depicted by Equation I:

(I)
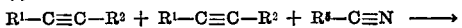

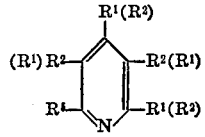

in which $R^1$ and $R^2$ are selected from hydrogen, alkyl of up to 10 carbons, alkenyl of up to 10 carbons, aralkyl of up to 10 carbon atoms or alkoxy of up to 12 carbon atoms, and preferably are hydrogen, alkyl or alkenyl of up to 6 carbon atoms. Of course when two different acetylenic compounds are employed the value of $R^1$ and/or $R^2$ will accordingly be different in the two formulae for the acetylenic compound in Equation I. $R^5$ may be alkyl, alkenyl or aryl of up to 20 carbon atoms, and preferably is alkyl, alkenyl or aryl of up to 8 carbon atoms. $R^5$ may also be substituted with cyano, alkoxycarbonyl and carbonyl, with the proviso that the resultant nitrile is not subject to rapid homooligomerization or homopolymerization under the reaction conditions.

Catalysts

The cobalt catalyst may be selected from the classes:
(I) Cobalt metal;
(II) Cobalt oxides and simple cobalt salts such as the acetate, formate, citrate, tartrate, propionate, fluoride, chloride, bromide, iodide, nitrate, sulfate stearate and naphthenate.
(III) Cobalt complexes which may be cations, anions, or neutral molecules, and in which the cobalt has two or four to six coordinating sites occupied by ligands selected from the group of hydrogen [1], alkyl [1], carbonyl [4], nitroso [1], phosphine [4], dodecahydrodecaborate$^{-2}$ [2], enolates of β-keto esters [3], and 1,3-diketones [3], poly(pyrazolyl)borates [2], glyoximes [2], with the proviso that the number of ligands linked to each cobalt atom does not exceed the bracketed number following each ligand class.

More specifically, alkyl ligands may contain up to 8 carbon atoms, e.g., methyl, ethyl, propyl, benzyl, may be employed. Phosphine ligands may be the parent phosphine, $PH_3$, or alkyl or aryl-containing phosphines, e.g., trimethylphosphine, triethylphosphine, tripropylphosphine, dimethylphenylphosphine, diethylphenylphosphine, ethyldiphenylphosphine, triphenylphosphine, 1,2-ethylene-bis-diethylphosphine, 1,2-ethylene-bis-diphenylphosphine. Exemplary β-keto esters are the enolates of ethyl acetoacetate, ethyl 2-methylacetoacetate, methyl acetoacetate, ethyl benzoylacetate, ethyl β-ketopropionate, ethyl β-ketovalerate, and the like. Operable 1,3-diketones include the enolic forms of acetylacetone, propionylacetone, benzoylacetone, dibenzoylmethane, 1,1-dibenzoylethane, 3-methyl-2,4-pentanedione, 2,4-hexanedione and homologs.

Examples of poly(pyrazolyl)borates include dihydrobis(pyrazolyl)borate, di(hydrocarbyl)bis(pyrazolyl)borate

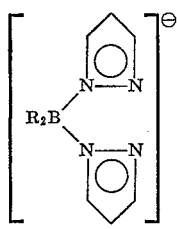

in which R is an alkyl or aryl of up to 18 carbon atoms, specifically diethylbis(pyrazolyl)borate, dipropylbis(pyrazolyl)borate, diphenylbis(pyrazolyl)borate, and the like. Glyoximate ligands include glyoxime and dioximes of dimethylglyoxal, furil, benzil and close homologs.

Where the combination of cobalt and ligand results in an anion, the counter-ion needed to make a neutral molecule may be any metal cation, preferably an alkali metal, alkaline-earth metal, or $Cu^{+2}$, $Cd^{+2}$, $Zn^{+2}$, $Pb^{+2}$, $Sn^{+2}$, $Hg^{+2}$, cation, or a quaternary ammonium ion, preferably a tetra(lower alkyl)ammonium ion such as tetramethylammonium, tetraethylammonium, n-butyltrimethylammonium, tetraisopropylammonium and the like. When the cobalt/ligand combination results in a cation, the counter-anion may be halogen. As noted above, cobalt metal, especially in a form having high surface to volume ratio, is effective in catalyzing the reaction of this invention. Supported cobalt metal, e.g., on alumina, silica or kieselguhr, is also effective in catalyzing pyridine synthesis. Cobalt oxide, $Co_2O_3$, is similarly useful as a catalyst.

A possible explanation of the catalytic efficiency of such a variety of cobalt compounds, though not limiting the invention, is that none of the materials added to the reaction mixture is the true catalyst, but that the nominal catalysts added are all converted by reaction with the acetylene(s) and/or the nitrile to a unique compound or complex of cobalt that effects the reaction described. Specific catalysts useful in the practice of this invention include:

bis-tetramethylammonium bis(dodecahydrodecaborate) cobaltate(II)
cobalt(II) dihydrobis(1-pyrazolyl)borate
nitrosotricarbonylcobalt(O)
dicobalt(O)octacarbonyl
cobalt(III) acetylacetonate
cobalt(II) acetylacetonate
mercury(II) bis[tetracarbonylcobaltate(-1)]
triphenylphosphinenitrosodicarbonylcobalt(O)
tetramethylammonium (dodecahydrodecaborate)tricarbonylcobaltate(1)
[1,2-bis(diphenylphosphino)ethane]cobalt(II)dichloride
(triphenylphosphine)methylcobalt(III) bis(diemthylglyoximate)
bis(triethylphosphine)tricarbonylcobalt(I) tetraphenylborate
bis-[1,2-bis(dimethylphonsphino)ethane]cobalt(I) hydride
cobalt metal of 0.5-1.5 micron particle size
cobalt(III) oxide.

Acetylene Components

The acetylene component must not be subject to rapid homooligomerization homopolymerization which is always a possibility in the presence of cobalt complexes, for often such reactions take precedence over the formation of pyridines. For example, 3-butenyne, methyl propiolate and phenylacetylene trimerize to substituted benzenes so readily that only small yields of pyridines are obtained. Generally substituted acetylenes in which any substitutent is non-conjugated with or at least two carbon atoms removed from the C≡C group do not homooligomerize or homopolymerize too rapidly under the reaction conditions of this invention: Specific acetylenes for use in this invention include acetylene, methylacetylene, dimethylacetylene, butyne-1, pentyne-1, hexyne-1, monoalkylacetylenes having up to 10 carbon atoms, e.g., octylacetylene, dialkylacetylenes having up to 10 carbon atoms, e.g., pentyne-2, hexyne-2, hexyne-3, heptyne-2, heptyne-3, octyne-2, octyne-3, octyne-4, nonyne-2, nonyne-3, nonyne-4, decyne-2, decyne-3, decyne-4, decyne-5. Other useful acetylenes include 3-phenyl-1-propyne, 4-phenyl-1-butyne, 5-phenyl-1-pentyne, 5-phenyl-2-pentyne.

Nitrile Components

Exemplary nitriles, defined above, include acetonitrile, propionitrile, butyronitrile, 1-pentanenitrile, 1-hexanenitrile, 2-methylpentanenitrile, 1-heptanenitrile, 2-methylhexanenitrile, 2-ethylpentanenitrile, 1-octanenitrile, 2-methylheptanenitrile, 2-ethylhexanenitrile, 1-nonanenitrile and its isomers, 1-decanenitrile and its isomers, lauronitrile, hendecanenitrile, hexadecanenitrile, octadecanenitrile, eicosanenitrile, benzonitrile, o-, m- p-toluonitrile, 4-phenylbutanenitrile, 4-phenylbutanenitrile, p-ethylbenzonitrile, 5-ethoxycarbonyl-1-pentanenitrile, 5-acetyl-1-pentanenitrile, succinonitrile, glutaronitrile, adiponitrile, pimelonnitrile, suberonitrile, azelaonitrile, sebaconitrile, 1,20-eicosanedinitrile, acrylonitrile, allyl cyanide, crotononitrile, 3-pentene-1-nitrile, 4-pentene-1-nitrile, 3-hexene-1-nitrile, 2-hexene-1-nitrile, 2-heptene-1-nitrile, 3-octene-1-nitrile, 10-hendecene-1-nitrile, 19-eicosene-1-nitrile, and the like.

As noted earlier in the even the $R^5$ in $R^5—C≡N$ is substituted with cyano, alkoxycarbonyl or carbonyl the resultant nitrile should not be subject to rapid homooligomerization or homopolymerization under the reaction conditions of the present invention. Generally nitriles in which the above substituents are non-conjugated with or are at least two carbon atoms removed from the cyano group satisfy this requirement.

While pyridines can be detected in the product for reactions run at as low as 150° C., the present invention is usually practiced at temperatures in the range of 200-600° C. Batch reactions are usually run at 150-350° C., and preferably at 200-350° C. Higher temperatures are operable but safety considerations dictate the upper limit of 350° C. For flow processes employing only short contact times, the temperatures may range up to 600° C.

Reaction times may range from a few seconds under flow conditions at high temperatures up to several hours at lower temperatures.

Ideally, an acetylene:nitrile ratio of 2:1 would be desirable, this being the ratio in which the reactants combine to give pyridines. A high ratio of acetylene:nitrile, however, favors side reactions involving acetylene polymerizations, so that a lower acetylene:nitrile ratio, involving incomplete conversion of the nitrile, is usually desirable. On the other hand, where complete conversion of nitrile is desirable, as, for instance, in the conversion of dinitrile to a dipyridine, higher acetylene:nitrile ratios are indicated.

Generally, reactant ratios of acetylene:nitrile may be in the range 1:100 to 10:1, the preferred ranges being from 1:50 to 2:1 for reactions where total conversion of acetylene is desirable, and from 2:1 to 10:1 for reactions where total conversion of nitrile is desirable.

Pressure is a minor variable in this process. Depending upon the nature of the acetylene components, the nature of the nitrile component, the solvent, and the reaction temperature, superatmospheric pressure might be required to maintain reactants at sufficiently high concentration to promote reaction at a reasonable rate. The process is operable at substantially atmospheric pressure when the reactants are sufficiently high boiling. Generally, however, the pressure ranges from atmospheric to 3000 p.s.i. and preferably pressures from atmospheric to 1500 p.s.i. are employed.

The reaction is most conveniently run with no solvent, or with the nitrile component in excess as the only solvent, but any solvent, appropriately inert toward reactants, products, and catalysts, may be employed. Such solvents would include aliphatic and aromatic hydrocarbons, ethers, esters, and alcohols.

Products of this reaction may be isolated by standard procedures of distillation or of crystallization, where they are solid. Advantage may be taken of their basic character to extract them into aqueous acid, from which they may be recovered by basification, and this method is especially useful in affording pure product, free from non-basic side products, solvent, and reactants.

The reaction mixtures obtained in the following examples were analyzed by gas-liquid partition chromatography. The standard procedure employed a 6-ft. column packed with 20% silicone gum nitrile on "Gas Chrom" RA with a helium flow of 50 ml./min. at a temperature from 70–240° C. programmed to increase at 16° C./min. The analysis in Example 21 was carried out at a column temperature of 240° C. and those of Examples 27–31 at a column temperature of 160° C. Analyses of Examples 32–37 were carried out on a similar column packed with 20% Carbowax 4000/Chromosorb W at a fixed temperature of 150° C.

The product formed is reported as yield, based on the acetylene employed and calculated by the formula:

$$\text{Percent yield} = \frac{\text{Moles product} \times 100 \times 2}{\text{Moles acetylene(s)}}$$

The practice of this invention is more specifically described by the following examples wherein all parts and percentages are by weight, except when stated otherwise.

EXAMPLE 1

2-Methylpyridine From Acetylene and Acetonitrile in the Presence of $[(CH_3)_4N]_2[Co(B_{10}H_{12})_2]$ (A) Product identification.—A Pyrex tube, containing 0.5 g. of $[(CH_3)_4N]_2[Co(B_{10}H_{12})_2]$, was sealed under nitrogen and was placed in a 400-ml. stainless-steel shaker tube along with acetonitrile (60 ml.). The tube was cooled and evacuated, 10 g. (0.385 mole) of acetylene was added, and the mixture heated, with shaking and under autogenous pressure, at 50° C. for 2 hours, at 120° C. for 2 hours, and at 200° C. for 6 hours, the pressure reaching 540 p.s.i.g. at 200° C. and then decreasing to 480 p.s.i.g. The tube was cooled and vented and the contents were evaporatively distilled at room temperature and 1μ pressure to yield crude condensate (41.3 g.) and a residue of black solid (0.4 g.). Gas chromatography of the crude condensate revealed a major component at 7.2 minutes, in addition to peaks due to acetonitrile and a trace of benzene. The component at 7.2 minutes was isolated from the effluent stream of the gas chromatograph in a Dry-Ice trap, diluted with carbon tetrachloride, and examined by NMR and IR spectroscopy; both spectra were identical with those of an authentic pure sample of 2-methylpyridine.

(B) Yield.—The reaction was run exactly as in (A), above, except that the tube was heated at 200° C. for 6 hours and at 250° C. for 6 hours, the pressure decreasing from 510 to 440 p.s.i.g. at 200° C., and from 720 to 625 p.s.i.g. at 250° C. The tube contents were processed as in (A), above, to yield crude condensate (34.6 g.) and residue (1.0 g.). Known weights of crude condensate (3.8 g.) and of dioxane (0.4 g.) were mixed, the mixture was subjected to gas chromatography, and the dioxane and 2-methylpyridine components in the effluent gas stream were caught in the same Dry-Ice trap. The contents of the Dry-Ice trap were diluted with water and examined by NMR spectroscopy. Comparison of the integrated area due to protons on 2-methylpyridine (236 units) with that due to protons on dioxane (331 units) permitted the calculation of yield of 2-methylpyridine in crude condensate as 0.034 mole (3.2 g., 18% on acetylene charged).

EXAMPLE 2

2-Methylpyridine From Acetylene and Acetonitrile in the Presence of Cobalt(II) Dihydrobis(1-Pyrazolyl)Borate A Pyrex tube, containing 1.0 g. of

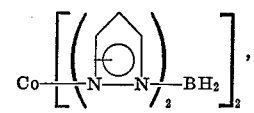

was sealed under nitrogen and placed in a 400-ml. stainless-steel shaker tube along with acetonitrile (60 ml.). The tube was cooled and evacuated, acetylene (10 g., 0.385 mole) was added, and the mixture heated, with shaking and under autogenous pressure, at 200° C. for 8 hours, during which time the pressure decreased from 480–240 p.s.i.g. The tube was cooled and vented and the contents were evaporatively distilled at room temperature and 1μ to yield crude condensate (44.6 g.) and residue (3.0 g.). Gas chromatography of the crude condensate revealed the presence of a major component at 7.1 minutes which was identified as 2-methylpyridine by enhancement of the peak height (and absence of a new peak) when 2-methylpyridine was added to a sample of the crude condensate and the mixture was subjected to gas chromatography under identical conditions. For quantitative analysis, known weights of crude condensate (7.23 g.) and of dimethylformamide (0.80 g.) were mixed, the mixture was subjected to gas chromatography, and the dimethylformamide and 2-methylpyridine components in the effluent gas stream were caught in the same Dry-Ice trap. The contents of the Dry-Ice trap were diluted with deuterium oxide and examined by NMR spectroscopy. The spectrum confirmed the identity of the product as 2-methylpyridine. Comparison of the integrated area of the spectrum due to protons on dimethylformamide (472 units) with that due to protons on 2-methylpyridine (596 units) permitted calculation of the yield of 2-methylpyridine in crude condensate as 0.083 mole (7.9 g., 44% on acetylene charged).

EXAMPLES 3–16

2-Methylpyridine From Acetylene and Acetonitrile in the Presence of Various Cobalt Catalysts The results of these examples are summarized in Table I. In each case, the catalyst (0.5–1.0 g.) shown in column 1, sealed in a Pyrex tube under nitrogen, was placed in a 400 ml. stainless-steel shaker tube along with acetonitrile (60 ml.). The tube was cooled and evacuated, 10 g. of acetylene added, and the mixture heated, with shaking and under autogenous pressure, at 50° C. for 2 hours, then at 120° C. for 2 hours, then at 200° C. for 6 hours. The reaction mixtures were processed and analyzed as described in Example 2.

TABLE I

[2-methylpyridine from acetylene and acetonitrile in the presence of various cobalt catalysts]

| Example No. | Catalyst | Percent yield |
|---|---|---|
| 3 | Co(NO)(CO)$_3$ | 25 |
| 4 | Co$_2$(CO)$_8$ | 24 |
| 5 | Co(acetylacetonate)$_2$ | 20 |
| 6 | Co(acetylacetonate)$_3$ | 23 |
| 7 | Co(acetate)$_2$ | 5 |
| 8 | Hg[Co(CO)$_4$]$_2$ | 24 |
| 9 | Co[P(C$_6$H$_5$)$_3$](NO)(CO)$_2$ | 7 |
| 10 | [(CH$_3$)$_4$N][Co(CO)$_3$(B$_{10}$H$_{12}$)] | Trace |
| 11 | 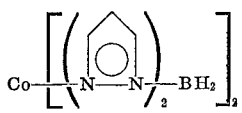 | 6 |
| 12 | 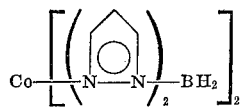 | 25 |
| 13 | Co$_2$(PH$_3$)$_2$(CO)$_7$ | 19 |
| 14 | [B(C$_6$H$_5$)$_4$]{Co(CO)$_3$[P(C$_2$H$_5$)$_3$]$_2$} | 34 |
| 15 | Co metal powder* | 34 |
| 16 | Co$_2$O$_3$* | 28 |

*Reaction at 350° C. for 8 hours.

EXAMPLE 17

Trimethylpyridines From Methylacetylene and Acetonitrile in the Presence of Cobalt(II) Dihydrobis(1-Pyrazolyl)Borate In a 400-ml. stainless-steel shaker tube was placed 1.0 g. of

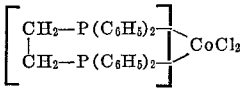

and acetonitrile (60 ml.). The tube was cooled and evacuated, 20 g. (0.5 mole) of methylacetylene was added and the mixture heated, with shaking under autogenous pressure at 200° C. for 8 hours, during which time the pressure decreased from 600 to 340 p.s.i.g. The tube was cooled and vented and the tube contents were rinsed out with a little acetonitrile and evaporatively distilled at room temperature and 1μ to yield crude condensate (74.2 g.) and a black residue (3.0 g.). Gas chromatography of the crude condensate revealed major components at 8.9 minutes and 9.1 minutes. These components were isolated from the effluent stream of the gas chromatograph in separate Dry-Ice traps, diluted with deuterioacetone, and examined by NMR spectroscopy. The NMR spectrum of the 8.9 minute peak exhibited singlets at 3.73τ (2 protons, 3- and 5-pyridine protons) and 8.20τ (6 protons, 2- and 6-methyl protons), and 8.35τ (3 protons, 4-methyl protons), and was consistent only with 2,4,6-trimethylpyridine. The NMR spectrum of the 9.1 minute peak exhibited doublets at 3.20τ (J=7.0 c.p.s.) and 3.61τ (J=7.0 c.p.s.) (total of 2 protons, 3- and 4-pyridine protons), and singlets at 8.19τ (6 protons, 2- and 6-methyl protons) and 8.35τ (3 protons, 3-methyl protons); consistent with 2,3,6-trimethylpyridine. For infrared spectral analysis, the two components were isolated from the effluent stream of the gas chromatograph in separate Dry-Ice traps, and examined as neat liquids. The infrared spectrum of the 8.9 minute peak was identical with that of an authentic sample of 2,4,6-trimethylpyridine; that of the 9.1 minute peak was consistent with its assigned structure as 2,3,6-trimethylpyridine.

For quantitative analysis, a portion of the crude condensate (10 g.) was mixed with dimethylformamide (0.86 g.); this mixture was subjected to gas chromatography and from the effluent gas stream the two components were collected in a single Dry-Ice trap along with the dimethylformamide. The trap contents were diluted with deuterioacetone and examined by NMR spectroscopy. Comparison of the integrated area (114 units) due to the protons on the trimethylpyridines with that (64 units) due to the protons on dimethylformamide, permitted the calculation of conversion of trimethylpyridines in the crude condensate as 0.103 mole. Comparison of the integrated area (68 units) due to the low-field doublet with that (147 units) due to the low-field singlet permitted calculation of isomer distribution in the crude condensate.

Thus, there were produced 12.5 g. (0.103 mole) of trimethylpyridines (41% yield, based on methylacetylene) and these consisted of 68% of 2,4,6-trimethylpyridine and 32% of 2,3,6-trimethylpyridine.

EXAMPLE 18

2,3,6-Trimethylpyridine From Acetylene, 2-Butyne and Acetonitrile in the Presence of Cobalt(II) Dihydrobis (1-Pyrazolyl) Borate In a 400-ml. stainless-steel shaker tube was placed 1.0 g. of catalyst,

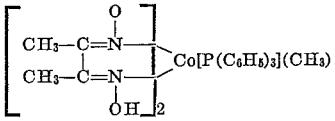

2-butyne (37.5 g., 0.70 mole) and acetonitrile (60 ml.). The tube was cooled and evacuated, 10 g. (0.385 mole) of acetylene was added and the mixture heated, with shaking under autogenous pressure at 200° C. for 8 hours. During this time the pressure decreased from 740 to 420 p.s.i.g. The tube contents were evaporatively distilled at room temperature and 1μ to yield crude condensate (76.4 g.) and residue (4.0 g.). Gas chromatography of the crude condensate revealed a major component at 8.8 minutes, in addition to 2-methylpyridine. For qualitative analysis, this component was isolated from the effluent stream of the gas chromatograph and examined by NMR and infrared spectroscopy; both spectra were identical with those of 2,3,6-trimethylpyridine isolated in Example 17. For quantitative analysis, a portion (10 g.) of crude condensate was mixed with dimethylformamide (0.80 g.) and the mixture was subjected to gas chromatography as above. From the effluent stream, the 2 - methylpyridine, 2,3,6-trimethylpyridine, and dimethylformamide components were caught in a single Dry-Ice trap, and the trap contents were diluted with deuterioacetone and examined by NMR spectroscopy. Comparison of the integrated area (502 units) due to the methyl protons of dimethylformamide with that (663 units) due to the methyl protons of the pyridine components indicated a yield of 0.221 equivalents of pyridine methyl groups. Comparison of the integrated area (42 units) due to the 6-pyridine proton of 2,3,6-trimethylpyridine, indicated a product distribution of 41 mole percent of 2-methylpyridine and 59 mole percent of 2,3,6-trimethylpyridine. Thus, the reaction produced 0.041 mole (3.8 g., 21% yield on acetylene charged) of 2-methylpyridine, and 0.060 mole (7.3 g., 16% yield on acetylene charged, 9% yield on 2-butyne charged) of 2,3,6-trimethylpyridine.

EXAMPLE 19

2-Ethylpyridine From Acetylene and Propionitrile (A) Product identification.—A Pyrex tube, containing 0.5 g. of [(CH$_3$)$_4$N]$_2$[Co(B$_{10}$H$_{12}$)$_2$] was sealed under nitrogen and placed in a 400-ml. stainless-steel shaker tube along with propionitrile (60 ml.). The tube was cooled and evacuated, 10 g. of acetylene was added and the mixture heated, with shaking under autogenous pressure at 200° C. for 8 hours, and then at 250° C. for 8 hours. The pressure decreased from 460 to 400 p.s.i.g. at 200° C., and from 640 to 610 p.s.i.g. at 250° C. The tube was cooled and vented, and the tube contents were removed and extracted with aqueous hydrochloric acid. The aqueous extract was made basic with sodium hydroxide and the oil which appeared was extracted into dichloromethane. The dichloromethane extract was dried over potassium carbonate, filtered, and concentrated to small volume. Gas chromatography of the concentrate revealed a major component at 7.6 minutes. This component was isolated from the effluent stream of the gas chromatograph and was examined by NMR and infrared spectroscopy. The NMR spectrum was consistent with 2-ethylpyridine, exhibiting multiplet absorption at 1.96 to 2.03$\tau$ (1 proton, 6-aromatic proton), 2.96 to 3.20$\tau$ (1 proton, 4-aromatic proton) and 3.45 to 3.68$\tau$ (2 protons, 3- and 5-aromatic protons) and a quadruplet (J=7.4 c.p.s.) at 7.80$\tau$ (2-protons, methylene protons) and a triplet (J=7.4 c.p.s.) at 9.33$\tau$ (3 protons, methyl protons). The infrared spectrum was identical with that of an authentic sample of 2-ethylpyridine.

(B) Conversion.—A Pyrex tube, containing 0.5 g. of cobalt(II) dihydrobis(1-pyrazolyl)borate was sealed under nitrogen and placed in a 400-ml. stainless-steel shaker tube along with propionitrile (60 ml.). The tube was cooled and evacuated, 10 g. (0.385 mole) of acetylene was added and the mixture heated, with shaking under autogenous pressure at 200° C. for 8 hours. The tube was cooled and vented, and the tube contents were evaporatively distilled at room temperature and 1$\mu$ to yield crude condensate (39.0 g.) and residue (2.1 g.). Gas chromatography of the crude condensate revealed the presence of a major component at 8.2 minutes which was identified as 2-ethylpyridine by enhancement of the peak height (and absence of a new peak) when pure 2-ethylpyridine was mixed with a portion of the crude condensate and subjected to gas chromatography. For quantitative analysis, known weights of crude condensate (10.0 g.) and of dimethylformamide (0.58 g.) were mixed, the mixture was subjected to gas chromatography, and the dimethylformamide and 2-ethylpyridine components in the effluent gas stream were collected in the same Dry-Ice trap. The contents of the trap were diluted with deuterioacetone and examined by NMR spectroscopy. The spectrum confirmed the identity of the product as 2-ethylpyridine. Comparison of the integrated area of the spectrum due to protons on dimethylformamide (210 units) with that due to the protons on 2-ethylpyridine (159 units) permitted calculation of the yield of 2-ethylpyridine in crude condensate as 0.0184 mole (1.97 g., 9.5% yield on acetylene charged).

EXAMPLE 20

2-Ethylpyridine from Acetylene and Propionitrile in the Presence of $Co_2(CO)_8$ A Pyrex tube containing 1.0 g. of $Co_2(CO)_8$ was sealed under nitrogen and was placed in a 400-ml. stainless-steel shaker tube, along with 60 ml. of propionitrile. The tube was cooled and evacuated, 10 g. (0.385 mole) of acetylene was added and the contents heated, with shaking under autogenous pressure at 120° C. for 2 hours (275 p.s.i.g.), 160° C. for 2 hours (360 p.s.i.g.), and 200° C. for 6 hours (460 to 320 p.s.i.g.). The tube was cooled and vented and the tube contents were processed as in Example 19 to yield 62.8 g. of crude condensate and 4.6 g. of residue. The crude condensate was analzed as in Example 19 and was found to contain 5.6 g. (0.053 mole, 27% on acetylene charged) of 2-ethylpyridine.

EXAMPLE 21

2-Phenylpyridine From Acetylene and Benzonitrile in the Presence of Cobalt(II) Dihydrobis(1-pyrazolyl)Borate A Pyrex tube, containing 1.0 g. of cobalt(II) dihydrobis(1-pyrazolyl)borate, was sealed under nitrogen and placed in a 400-ml. stainless-steel shaker tube along with 60 ml. of benzonitrile. The tube was cooled and evacuated, 10 g. of acetylene was added and the contents heated, with shaking under autogenous pressure at 200° C. for 8 hours. The tube was cooled and vented, and the tube contents were concentrated at room temperature and 1$\mu$ to yield condensate and residue (22.5 g.). The residue was evaporatively distilled at room temperature and 0.01$\mu$ to yield condensate (9.1 g.) and residue. Gas chromatography of the condensate indicated that it consisted chiefly of a component with a retention time of 8.9 minutes. This component was collected from the effluent gas stream of the gas chromatograph and was examined by NMR and infrared spectroscopy. The NMR spectrum was consistent with 2-phenylpyridine, exhibiting multiplets at 2.03 to 2.22$\tau$ (1 proton, 6-pyridine proton), 2.51 to 2.61$\tau$ (2 protons, 4- and 5-pyridine protons), 3,36 to 3.61$\tau$ (5 protons, phenyl protons), and 3.80 to 4.00$\tau$ (1 3-pyridine proton). The infrared spectrum was identical with that of an authentic sample of 2-phenylpyridine. This yielded 2-phenylpyridine (ca. 9.1 g.) (0.059 mole) 30% yield based on acetylene charged.

EXAMPLE 22

2-Propenylpyridines From Acetylene and Crotononitriles in the Presence of Cobalt(II) Dihydrobis(1-Pyrazolyl) Borate A Pyrex tube, containing 1.0 g. of cobalt(II) dihydrobis(1-pyrazolyl)borate, was sealed under nitrogen and placed in a 400-ml. stainless-steel shaker tube along with crotononitrile (20 g., 69% cis-isomer, 31% trans-isomer) and 50 ml. of benzene. The tube was cooled and evacuated, 10 g. (0.385 mole) of acetylene was added and the contents heated, with shaking under autogenous pressure at 200° C. for 8 hours. The tube was cooled and vented, and the tube contents were rinsed out with a little benzene and evaporatively distilled at room temperature and 0.01$\mu$ to yield crude condensate (59.8 g.) and residue. The crude condensate was stirred with water and titrated to the methyl orange endpoint with 6.67N hydrochloric acid (12.2 ml. required). The aqueous layer was separated, to it was added 17 ml. of 6.67N sodium hydroxide, and the resulting oil was extracted with dichloromethane (100 ml.). The dichloromethane layer was dried over potassium carbonate, filtered, and concentrated to small volume. Gas chromatography of the concentrate revealed the presence of two components at 10.3 and 10.9 minutes, respectively. For qualitative analysis, each component was collected, separately, from the effluent stream of the gas chromatograph, diluted with deuterioacetone, and examined by NMR spectroscopy. The 10.3 minute component showed a doublet (J=4 c.p.s.) at 1.94$\tau$ (1 proton, 6-pyridine proton), a multiplet at 2.52 to 2.94$\tau$ (1 proton, 4-pyridine proton), a multiplet at 3.19 to 3.50$\tau$ (2 protons, 3- and 5-pyridine protons), a multiplet at 4.15 to 4.88$\tau$ (2 protons, olefinic protons), and a pair of doublets ($J_{outer}$=8.6 c.p.s., $J_{inner}$=5.5 c.p.s.) at 8.47$\tau$ (3 protons, methyl protons). The 10.9 minute component showed a doublet (J=5 c.p.s.) at 2.08$\tau$ (1 proton, 6-pyridine proton), a multiplet at 2.83 to 3.08$\tau$ (1 proton, 4-pyridine proton), a multiplet at 3.28 to 4.01$\tau$ (4 protons, 3- and 5-pyridine protons and olefinic protons), and doublet (J=6.0 c.p.s.) at 8.77$\tau$ (3 protons, methyl protons). For the estimation of relative conversions, both the 10.3 and the 10.9 minute components were collected from the effluent gas stream in the same trap, diluted with deuterioacetone, and examined by NMR spectroscopy. By comparison of the relative areas under the signals due to the methyl groups, it was concluded that of the total sample, 32% consisted of the 10.3 minute component and 68% of the 10.9 minute component. For examination by infrared spectroscopy, the two components were collected separately from the effluent stream of the gas chromatograph and examined as neat liquids. The spectrum of the 10.3 minute component was consistent with that of cis-2-propenylpyridine, exhibiting, among others, absorption at 794 and 699 cm.$^{-1}$ (cis-CH=CH) and 743 cm.$^{-1}$ (2-substituted pyridine); the spectrum of the 10.9 minute component was consistent with that of trans-2-propylpyridine, exhibiting, among others, absorption at 968 cm.$^{-1}$ (*trans*-CH=CH) and 749 cm.$^{-1}$ (2-substituted pyridine. Thus, 2-propenylpyridines were produced at 42% yield based on acetylene charged, and consisted of 32% cis-2-propenyl-pyridine and 68% *trans*-2-propenylpyridine..

EXAMPLE 23

2-Propenylpyridines From Acetylene and Allyl Cyanide in the Presence of Cobalt(II) Dihydrobis(1-Pyrazolyl) Borate A Pyrex tube, containing 1.0 g. of cobalt(II) dihydrobis(1-pyrazolyl)borate, was sealed under nitrogen and placed in a 400-ml. stainless-steel shaker tube along with 30 g. of allyl cyanide and 60 ml. of toluene. The tube was cooled and evacuated, 10 g. (0.385 mole) of acetylene was added and the contents heated, with shaking and under autogenous pressure at 200° C. for 8 hours, during which time the pressure decreased from 550 to 245 p.s.i.g. The tube was cooled and vented, and the tube contents were evaporatively distilled at room temperature and 0.001µ to afford crude condensate (96.1 g.) and a blank residue (4.9 g.). Gas chromatographic analysis of the crude condensate showed the presence of *trans*-2-propenylpyridine (major) and cis-2-propenylpyridine (minor) as the only products, and also revealed a complete rearrangement of unreacted allyl cyanide to a mixture of cis- and *trans*-crotononitriles. This yielded propenylpyridines (4.0 g., ca. 0.037 mole); 19% yield based on acetylene charged.

EXAMPLE 24

1,4-Bis(2-Pyridyl)Butane and 5 - (2 - Pyridyl)Pentanenitrile From Acetylene and Adiponitrile in the Presence of Cobalt(II) Dihydrobis(1-pyrazolyl)Borate (A) Yield.—In a 400-ml. stainless-steel shaker tube was placed 3.0 g. of cobalt(II) dihydrobis(1-pyrazolyl)borate, 1.0 ml. of pyridine and 27.0 g. (0.250 mole) of adiponitrile. The tube was cooled and evacuated, charged with acetylene, and heated at 200° C. for 18 hours. Pressure was maintained at ca. 200 p.s.i.g. by periodic repressuring with acetylene, the total acetylene amounting to 35.0 g. The tube was cooled and vented, and the tube contents were rinsed out with dichloromethane (100 ml.). The dichloromethane solution was filtered, and the filtrate was stirred with 300 ml. of water and 80 ml. (0.96 mole) of concentrated hydrochloric acid. The aqueous layer was drawn off and extracted with dichloromethane until the extracts were nearly colorless. To the aqueous layer was added 45 g. (1.12 mole) of sodium hydroxide, and the oil which appeared was extracted into 100 ml., and then 50 ml. of dichloromethane. The dichloromethane extracts were combined, dried over potassium carbonate, filtered, and evaporated at the water pump to yield crude basic product (30.7 g.) as a black oil. This oil was chromatographed on silicic acid (1200 g.). 5-(2-Pyridyl)pentanenitrile was eluted with 3:1 ether:acetone and, after evaporation of solvent on the water pump, amounted to 11.7 g. (29% on adiponitrile) as a dark oil which exhibited an infrared spectrum identical with that of the analytical sample. 1,4-Bis(2-pyridyl)butane was eluted with 1:1 ether:acetone and, after evaporation of solvent on the water pump, amounted to 11.5 g. (22% yield based on adiponitrile) as an off-white solid which, after recrystallization from pentane, afforded good quality product (11.0 g.), m.p. 46–47° C., which exhibited an infrared spectrum identical with that of the analytical sample.

(B) Identification of 5-(2-pyridyl)pentanenitrile.—From another run, conducted and processed as in (A) above, was obtained a crude basic fraction which was chromatographed on alumina (Woelm basic alumina, activity I). 5-(2-Pyridyl)pentanenitrile was eluted with 5% of methanol in dichloromethane, and was obtained as a pale yellow oil by evaporation of solvent. Evaporative distillation of this material at room temperature and 0.001µ afforded the analytical sample of 5-(2-pyridyl)pentanenitrile as a colorless oil.

*Analysis.*—Calcd. for $C_{10}H_{12}N_2$: C, 74.96; H, 7.55; N, 17.49. Found: C, 75.01; H, 7.56; N, 17.64.

The NMR spectrum (neat sample, external tetramethylsilane reference) exhibited a multiplet at 1.71 to 1.82τ (1 proton, 6-pyridine proton), a multiplet at 2.60 to 2.88τ (1 proton, 4-pyridine proton), a multiplet at 3.15 to 3.33τ (2 protons, 3- and 5-pyridine protons), triplets at 7.57 (J=7.0 c.p.s.) and 7.97τ (J=6.5 c.p.s.) (total of 4 protons, terminal methylene protons), and a multiplet centered at 865τ (4 protons, central methylene protons). The infrared spectrum (neat sample) was consistent with the assigned structure, exhibiting absorption, among others, at 3065 and 3020 cm.$^{-1}$ (aromatic C-H), 2960 and 2885 cm.$^{-1}$ (saturated C-H), 2240 cm.$^{-1}$ (C≡N), 1590, 1570 and 1475 cm.$^{-1}$ (aromatic unsaturation) and 760 cm.$^{-1}$ (2-substituted pyridine). The ultra violet spectrum (95% ethanol) was typical for a 2-substituted pyridine with $\gamma_{max}$. 2680 A. (ε=2720), 2620 A. (ε=3680), and 2570 A. (ε=3170).

(C) Identification of 1,4-Bis(2-Pyridyl)Butane.—From another run, conducted and processed much as in (A) above, was obtained crude 1,4-*bis*(2-pyridyl)butane as a tan solid. A single recrystallization of this material from pentane afforded the analytical sample of 1,4-*bis*(2-pyridyl)butane as chunky white crystals, m.p. 47–48° C.

The NMR spectrum (carbon tetrachloride, external tetramethylsilane reference) exhibited a multiplet at 1.68 to 1.80τ (2 protons, 6-pyridine protons), a multiplet at 2.58 to 2.86τ (2 protons, 4-pyridine protons), a multiplet at 3.11 to 3.25τ (4 protons, 3- and 5-pyridine protons), a multiplet centered at 7.42τ (4 protons, external methylene protons), and a multiplet centered at 8.40τ (4 protons, central methylene protons). The infrared spectrum (potassium bromide wafer) was consistent with the structure, exhibiting absorption, among others, at 3060 and 3010 cm.$^{-1}$ (aromatic C-H), 2960 and 2860 cm.$^{-1}$ (aliphatic C-H), 1585, 1565, and 1475 cm.$^{-1}$ (aromatic unsaturation) and 748 cm.$^{-1}$ (2-substituted pyridine). The ultra-violet spectrum (95% ethanol) was typical for a 2-substituted pyridine with $\gamma_{max}$. 2680 A. (ε=6660), 2620 A. (ε=8650), and 2570 A. (ε=7280).

EXAMPLE 25

Trimethylpyridines From Methylacetylene and Acetonitrile in the Presence of Cobalt(II) Dihydrobis(1-Pyrazolyl)Borate Effect of temperature on yield.—The reaction between methylacetylene and acetonitrile was conducted exactly as in Example 17, except that the temperature of the reaction was 300° C., and as a result the pressure decreased from 780 to 660 p.s.i.g. The reaction mixture was processed and analyzed exactly as in Example 17. The trimethylpyridines amounted to 17.7 g. (0.146 mole, 58% yield, based on methylacetylene) and was composed of 70% of 2,4,6-trimethylpyridine and 30% of 2,3,6-trimethylpyridine. Thus, a higher temperature increased the yield of trimethylpyridines without affecting the isomer distribution.

EXAMPLE 26

Trimethylpyridines From Methylacetylene and Acetonitrile in the Presence of Cobalt(II) Dihydrobis(1-Pyrazolyl)Borate Effect of pressure on yield.—The reaction between methylacetylene and acetonitrile was conducted exactly as in Example 17, except that 60 g. (1.5 moles) of methylacetylene was employed, and as a result the pressure decreased from 1080 to 770 p.s.i.g. The reaction mixture was processed and analyzed exactly as in Example 17. The trimethylpyridines amounted to 17.1 g. (0.142 mole, 18.9% yield, based on methylacetylene) composed of 72% of 2,4,6-trimethylpyridine and 28% of 2,3,6-trimethylpyridine. The increased pressure of methylacetylene enhanced the amount of pyridines obtained.

EXAMPLES 27–31

2-Methylpyridine From Acetylene and Acetonitrile in the Presence of Cobalt(III) Acetylacetonate Effect of temperature on the yield.—The results of these experiments are summarized in Table II. In each case, 1.0 g. of cobalt(III) acetylacetonate was sealed in a Pyrex tube under nitrogen, placed in a 400-ml. stainless-steel shaker tube along with 60 ml. of acetonitrile. The tube was cooled and evacuated, 10 g. of acetylene added and the mixture heated, with shaking and under autogenous pressure at the indicated temperature for 8 hours. The reaction mixtures were processed as described in Example 2. Quantitative analyses were by gas chromatography of the crude condensates; peak heights of the 2-methylpyridine components were compared with a calibration curve, obtained from standard mixtures of 2-methylpyridine in acetonitrile. Yields were calculated on the basis of acetylene charged.

TABLE II

Effect of temperature on the yield of 2-methylpyridine from acetylene and acetonitrile in the presence of cobalt(III) acetylacetonate]

| Example No. | Temperature (° C.) | 2-methylpyridine (percent yield) |
| --- | --- | --- |
| 27 | 150 | 7 |
| 28 | 200 | 31 |
| 29 | 250 | 31 |
| 30 | 300 | 29 |
| 31 | 350 | 34 |

EXAMPLES 32–37

2-Methylpyridine From Acetylene and Acetonitrile in the Presence of Cobalt(III) Acetylacetonate Effect of chelating ligands on the yield.—The results of these experiments are summarized in Table III. In each case, 1.07 g. (3.0 mmoles) of cobalt(III) acetylacetonate was sealed in a Pyrex tube under nitrogen, and ligand, similarly encapsulated, was placed in a 400-ml. stainless-stele shaker tube along with 60 ml. of acetonitrile. The tube was cooled and evacuated, 10 g. of acetylene added and the mixture heated, with shaking and under autogenous pressure at 250° C. for 8 hours. The reaction mixtures were processed as described in Example 2. Quantitative analyses were by gas chromatography of the crude condensate; peak heights of the 2-methylpyridine components were compared with a calibration curve obtained from standard mixtures of 2-methylpyridine in acetonitrile. Yields were calculated on the basis of acetylene charged.

TABLE III

[Effect of chelating ligands on yield of 2-methylpyridine from acetylene and acetonitrile in the presence of cobalt(III) acetylacetonate at 250° C. for 8 hours]

| Example No. | Mmole Co(C₅H₇O₂)₃ | Ligand | Mmole ligand | Yield (percent) |
| --- | --- | --- | --- | --- |
| 32 | 3.0 | None | | 3d |
| 33 | 3.0 | 2,2′-dipyridyl | 3.0 | 28 |
| 34 | 3.0 | ...do... | 7.0 | 19 |
| 35 | 3.0 | ...do... | 18.0 | 21 |
| 36 | 3.0 | (C₆H₅)₂PCH₂CH₂P(C₆H₅)₂ | 3.0 | 16 |
| 37 | 3.0 | (C₆H₅)₂PCH₂CH₂P(C₆H₅)₂ | 6.0 | 0 |

EXAMPLE 38

2-Methylpyridine From Acetylene and Acetonitrile in the Presence of Bis[1,2 - Bis(Dimethylphosphino)Ethane] Cobalt(I) Hydride The procedure of Example 3 was followed, using the catalyst.

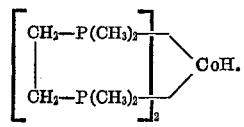

2-Methylpyridine, formed in 22% yield, was identified as described in preceding examples.

Preparation of Catalysts

Catalysts used in the preceding examples were prepared according to directions given in the following references or by the specific procedures not yet published.

Examples 1, 10, 19.—F. Klanberg, P. A. Wegner, G. W. Parshall, E. L. Muetterties, Inorg. Chem., 7, 2072 (1968).

Examples 2, 17, 18, 21, 22, 23, 24, 25, 26.—S. Trofimenko, J. Am. Chem. Soc., 89, 3170 (1967).

Example 3.—F. Seel, Z. Anorf. Allgem. Chem., 269, 40 (1952).

Examples 4–7, 20, 27–37.—Commercial products.

Example 8.—R. B. King, Organometallic Synthesis, 1, 101 (1965).

Example 9.—E. M. Thorstein, F. Basolo, J. Am. Chem. Soc., 88, 3939 (1966).

Example 11.—M. Iwamoto, S. Yuguchi, Bull. Soc. Chem. Jap. 41, 150 (1968).

Example 12.—G. N. Schrauzer, R. J. Windgassen, J. Am. Chem. Soc. 88, 3738 (1966).

Example 13.—Co₂(CO)₇(PH₃)₂.

Dicobalt octacarbonyl (6.8 g., 0.020 mole) in 100 ml. of ether was reacted with phosphine at room temperature. The black solid Co₂(CO)₇(PH₃)₂ (3.9 g.) precipitated. This was filtered off and washed with acetone. The infrared spectrum of the product showed P-H absorption at 2300 cm.⁻¹, broad unresolved CO absorption at 1960 cm.⁻¹, a sharp band at 1080 cm.⁻¹ (probably a P-H bending mode), and a broad band at 780 cm.⁻¹. It was incompletely soluble in pyridine and dimethylformamide, insoluble in other solvents.

Analysis.—Calcd. for Co₂(CO)₇(PH₃)₂: C, 22.0; H, 1.6; O, 29.3; P, 16.2; Co, 30.9. Found: C, 21.0; H, 1.9; O, 29.3; P, 15.1; Co, 31.4.

Example 14.—W. Hieber and W. Freyer, Chem. Ber., 93, 462 (1960).

Examples 15, 16.—Commercial products.

Example 38.—Preparation of

[(CH₃)₂PCH₂CH₂P(CH₃)₂]₂CoH (A) Preparation of

[(CH₃)₂PCH₂CH₂P(CH₃)₂]₂CoBr₂.

In a nitrogen atmosphere, 4.7 g. (0.0312 mole)

(CH₃)₂PCH₂CH₂P(CH₃)₂

[prepared as described by G. W. Parshall, J. Inorg. Nucl. Chem., 14, 291 (1960)] was added to a solution of CoBr₂ (3.3 g., 0.0151 mole) in 150 ml. of tetrahydrofuran. The blue-green solution rapidly deposited a brownish-red crystalline solid. The mixture was heated for 15 minutes to 45° C., cooled and the solid collected. Drying at 70° C./ 0.2µ for 16 hours gave 6.4 g. (80%) of brown-red

[(CH₃)₂PCH₂CH₂P(CH₃)₂]₂CoBr₂ which decomposes at 380° C.

Analysis.—Calcd. for C₁₂H₃₂Br₂CoP₄: C, 27.8; H, 6.2; Br. 30.7. Found: C, 27.7; H, 6.3; Br, 30.3.

The solid is slowly decomposed upon air exposure.

(B) Preparation of "[(CH₃)₂PCH₂CH₂P(CH₃)₂]₂Co" solution.—All manipulations were performed in a dry nitrogen atmosphere. A mixture of naphthalene (5.6 g., 0.0437 mole) and sodium chips (1.7 g., 0.0738 g. atom) in 75 ml. of tetrahydrofuran was stirred at room temperature for 2.5 hours to give a dark green solution of NaC₁₀H₈. This solution was then added in portions to a suspension of [(CH₃)₂PCH₂CH₂P(CH₃)₂]₂CoBr₂, prepared as in (A). The green color of the NaC₁₀H₈ solution was rapidly dischaged to give a dark brown-red solution containing a brown solid. This solution was freshly prepared before each experiment. The exact nature of the reduction product is unknown and will be referred to as "[(CH₃)₂PCH₂CH₂P(CH₃)₂]₂Co."

(C) Preparation of [(CH₃)₂PCH₂CH₂P(CH₃)₂]₂CoH from "[(CH₃)₂PCH₂CH₂P(CH₃)₂]₂Co" and H₂O.—A solution of "[(CH₃)₂PCH₂CH₂P(CH₃)₂]₂Co" was prepared as in (B) from 5.0 g. (0.0333 mole) of $$(CH_3)_2PCH_2CH_2P(CH_3)_2$$

3.5 g. (0.0160 mole) of CoBr₂, 6.2 g. (0.0483 mole) of naphthalene, and 2.7 g. (0.117 g. atom) of sodium. Addition of H₂O (0.31 g., 0.0171 mole) to the resulting red-brown solution caused the color to rapidly change to brown-yellow. After warming to 40° C. for 0.5 hour, the solvent was removed under vacuum, the residue extracted with petroleum ether (300 ml.), the extracts evaporated under vacuum and naphthalene removed from the orange residue at 30° C./0.5μ. The resulting product was sublimed at 90° C./0.6μ to give 3.7 g. (64%) of yellow, crystalline [(CH₃)₂PCH₂CH₂P(CH₃)₂]₂CoH, m.p. 99–101° C. An analytical sample was prepared by recrystallization from petroleum ether at −78° C. followed by two additional sublimations.

*Analysis.*—Calcd. for C₁₂H₃₃CoP₄: C, 40.0; H, 9.2; Co, 16.4; P, 34.4. Found: C, 39.6; H, 9.4; Co, 15.6; P, 34.5.

The product is a pyrophoric solid, soluble in petroleum ether, benzene and tetrahydrofuran. The infrared spectrum (Nujol mull) shows a Co-H stretching frequency at 1855 cm.⁻¹. The proton nmr spectrum shows the hydride resonance at +17.8 p.p.m. in tetrahydrofuran and at +23.4 p.p.m. in C₆H₆ solution (relative to internal $$(CH_3)_4Si).$$

Both resonances are observed as broad triplets with J_PH ~25 c.p.s. but are believed to actually be quintets based on the relative intensities.

The embodiments of the invention in which an exclusive property or privilege is claimed are defined as follows:

1. A process for the preparation of substituted pyridines comprising contacting at about 150° C. to 600° C., a nitrile of the formula
R⁵—C≡N, wherein R⁵ is alkyl, alkenyl or aryl of up to 20 carbon atoms and may be substituted with cyano, alkoxycarbonyl, and acetyl provided that the resultant nitrile is not subject to rapid homooligomerization or homopolymerization under the reaction conditions,
with at least one acetylenic compound of the formula
R¹—C≡C—R², wherein R¹ and R² are selected from hydrogen, alkyl of up to 10 carbons, alkenyl of up to 10 carbons, aralkyl of up to 10 carbon atoms or alkoxy of up to 12 carbon atoms, provided that said acetylenic compound is not subject to rapid homo-oligomerization or homopolymerization under the reaction conditions,
in the presence of a cobalt catalyst selected from the group consisting of
cobalt metal
cobalt oxide
simple cobalt salts selected from the group consisting of acetate, formate, citrate, tartrate, propionate, fluoride, chloride, bromide, iodide, nitrate, sulfate, stearate and naphthenate;
cobalt complexes in which the cobalt has 2 or 4 to 6 coordinating sites occupied by ligands selected from the group consisting of
  (i) hydrogen [1],
  (ii) alkyl of up to 8 carbon atoms [1],
  (iii) carbonyl [4],
  (iv) nitroso [1],
  (v) phosphine ligands [4] selected from the group consisting of phosphine, trimethylphosphine, triethylphosphine, tripropylphosphine, dimethylphenylphosphine, diethylphenylphosphine, ethyldiphenylphosphine, triphenylphosphine, 1,2-ethylene-bisdiethylphosphine, 1,2-ethylene-bis-dimethylphosphine, and 1,2-ethylene-bis-diphenylphosphine,
  (vi) dodecahydrodecaborate⁻² [2],
  (vii) enolates of β-keto esters [3] selected from the group consisting of ethyl acetoacetate, ethyl 2-methyl-acetoacetate, methyl acetoacetate, ethyl benzoylacetate, ethyl β-ketopropionate, and ethyl β-ketovalerate,
  (viii) enolates of 1,3-diketones [3] selected from the group consisting of acetylacetone, propionylacetone, benzoylacetone, dibenzoylmethane, 1,1-dibenzoylethane, 3-methyl-2,4-pentanedione, and 2,4-hexanedione,
  (ix) bis(pyrazolyl)borates [2] selected from the group consisting of
    dihydrobis(pyrazolyl)borate,
    diethylbis(pyrazolyl)borate,
    dipropylbis(pyrazolyl)borate, and
    diphenylbis(pyrazolyl)borate, and
  (x) glyoximate ligands [2] selected from the group consisting of glyoxime, dioxime of dimethylglyoxal, dioxime of furil, dioxime of benzil,
with the proviso that the number of ligands linked to each catalyst atom does not exceed the bracketed number following each ligand class,
  wherein when the combination of cobalt and ligand results in an anion, the counter-ion is selected from alkali metal, alkaline-earth metal, Cu⁺², Cd⁺², Zn⁺², Pb⁺², Sn⁺², Hg⁺², and tetra(lower alkyl)ammonium, and
  when the combination of cobalt and ligand results in a cation, the counter-ion is selected from halogen and B(C₆H₅)₄.

2. The process of Claim 1 wherein R¹ and R² are selected from hydrogen, alkyl or alkenyl of up to 6 carbon atoms.

3. The process of Claim 1 wherein R⁵ is alkyl, alkenyl or aryl of up to 8 carbon atoms.

4. The process of Claim 1 wherein the nitrile and acetylenic reactants are contacted in a batch process at about 200° C.–350° C.

References Cited

UNITED STATES PATENTS 1,421,743  7/1922  Stuer et al. _____ 260—290
3,264,307  8/1966  Jones _____ 260—290

HARRY I. MOATZ, Primary Examiner

U.S. Cl. X.R.

260—294.9, 295.5 R, 297 R